United States Patent [19]
Callahan

[11] 3,720,824
[45] March 13, 1973

[54] FISHING FLOAT LIGHT

[76] Inventor: Render B. Callahan, 2200 Enon Road S.W., Atlanta, Ga. 30331

[22] Filed: June 4, 1971

[21] Appl. No.: 150,136

[52] U.S. Cl. .................................240/6.4 F, 240/26
[51] Int. Cl. ................................................F21v 33/00
[58] Field of Search ............240/11.2, 52.1, 26, 6.4 F

[56] References Cited

UNITED STATES PATENTS 3,464,139   9/1969   Eggers..............................240/26 X
3,626,173   12/1971  Harvey............................240/52.1 X Primary Examiner—Samuel S. Matthews
Assistant Examiner—Kenneth C. Hutchison
Attorney—Newton, Hopkins & Ormsby

[57] ABSTRACT

A fishing float light including a support member capable of floating on the surface of a body of water, illuminating means located on said support member so as to direct light under said water surface, and means electrically associated with said illuminating means for connecting said illuminating means to a power source.

4 Claims, 2 Drawing Figures

INVENTOR.
RENDER B. CALLAHAN
BY
Newton, Hopkins, & Ormsby
ATTORNEYS

FISHING FLOAT LIGHT

BACKGROUND OF THE INVENTION

This invention relates to a fishing accessory and more particularly to a fishing float light.

Night fishing is a popular pastime for anglers. The most widely used method of night fishing usually includes lanterns that are hung over the side of a boat or a bridge or are secured to floating members so that they can float on the surface of the water. The light emitted from the lanterns attracts a number of insects as a result of which small fish are drawn to the area to eat the insects. These small fish in turn attract larger fish, such as crappie, catfish and carp, which can then be caught by a fisherman.

There are some disadvantages in the above described night fishing method. For one, the illuminating means is usually a gas lantern which is heavy and cumbersome to use. Also, since the lanterns are not of watertight construction, care must be taken so that no water enters them. Another drawback is that since the illumination is directed above the surface of the water, more of the insects tend to circle around the light instead of falling or being attracted to the surface of the water to be eaten by the small fish. These circling insects are annoying to the fisherman if he is fishing in close proximity to the light. Also, as a result of the fact that the light is directed upward from the water surface, the fish come to the area more for the insects than they do because of the attraction to the light. This tends to reduce the effective number of fish drawn to the fishing area.

SUMMARY THE INVENTION

Briefly described, the present invention includes a styrofoam support member which can float on the surface of a body of water, a light which is located on the support member to provide underwater illumination, and a clamping means for connecting the light to an external electrical power source.

It is, therefore, a primary object of this invention to provide a fishing float light to aid a fisherman in night fishing which is so constructed as to allow the light to float on the surface of a body of water and provide underwater illumination for attracting fish thereto.

Another object of the present invention is to provide a fishing float light which will furnish underwater illumination to attract a greater number of insects to the surface of a body of water than by previous methods, thereby attracting a greater number of fish which can be caught by a fisherman.

A further object of this invention is to provide a fishing float light so constructed as to furnish reflecting surface for the emitted light, thereby increasing the underwater illumination and attracting more fish thereto.

Another object of this invention is to provide a fishing float light whereby the insects attracted to the fishing area by the luminescence do not swarm around the light and annoy the fisherman.

It is still another object of this invention to provide a fishing float light which is constructed so as to be watertight, buoyant, and stable in its floating position.

Another object of this invention is to provide a fishing float light which is compact, lightweight, and easily maneuverable.

A still further object of this invention is to provide a fishing float light which is simple in construction and use, economical to manufacture, and reliable in operation.

Still other objects and advantages of the present invention will become apparent after reading the accompanying description of the selected illustrative embodiment of the invention with reference to the attached drawing wherein like reference characters have been used to refer to the like parts throughout the figures of the drawing, and wherein:

BRIEF DESCRIPTION OF THE FIGURES OF DRAWING

DETAILED DESCRIPTION OF THE ILLUSTRATIVE EMBODIMENT

Figure 1:
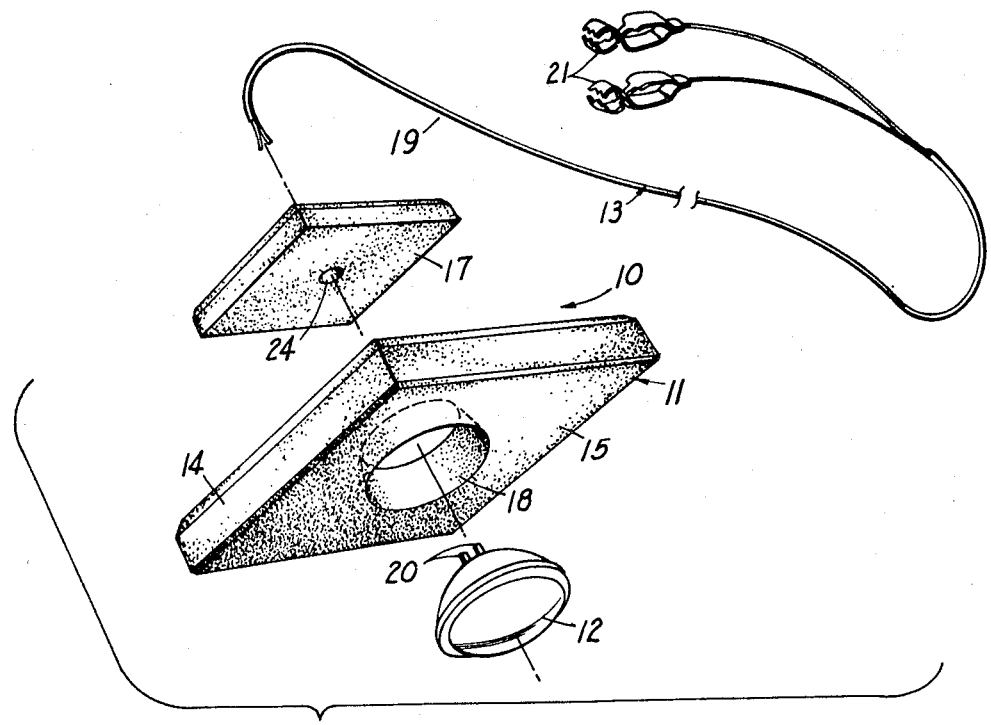
FIG. 1 is an exploded perspective view of the fishing float light.
Figure 2:
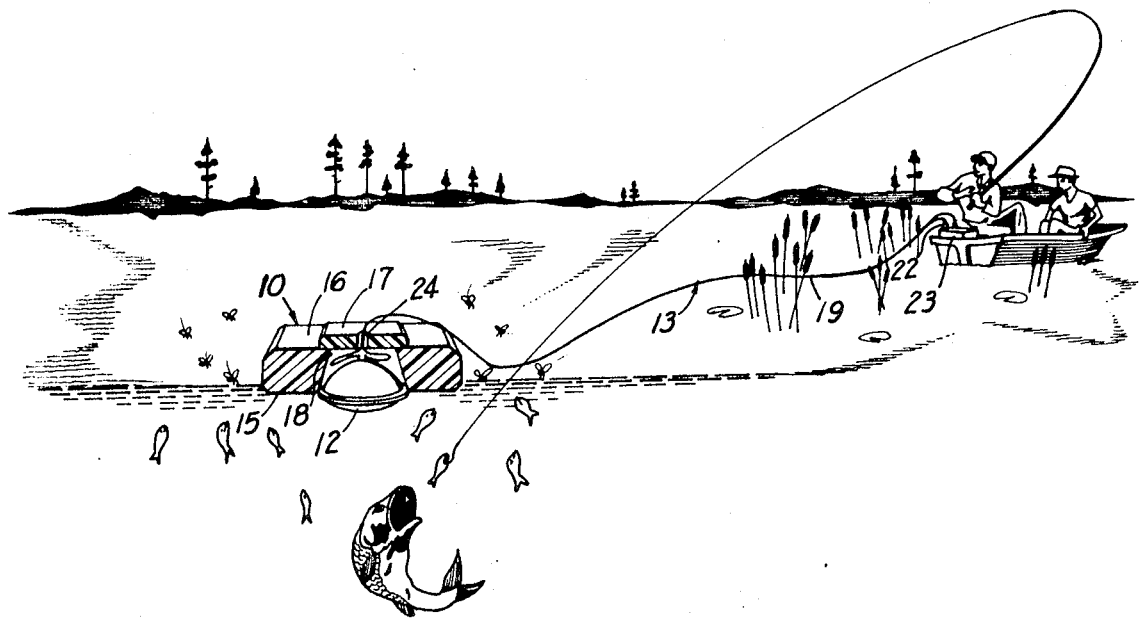
FIG. 2 is a cross-sectional side view of the fishing float light in operation.

Referring now in detail to the embodiment chosen for the purpose of illustrating the present invention, numeral 10 denotes generally the fishing float light as shown in FIGS. 1 and 2.

The apparatus 10 includes a support means 11 which is capable of floating on the surface of a body of water, an illuminating means 12 positioned on the support means 11 so as to shine below the water's surface, and a connecting means 13 electrically associated with the illuminating means 12 for attacking the illuminating means 12 to a source of current to power the same.

The support means 11 includes a square-shaped body section 14 having a planar bottom surface 15. It is understood, of course, that the body section 14 may be in any desirable shape, such as rectangular or circular, without affecting its floating characteristics. The height of the body section 14 is sufficient to receive at least the illuminating means 12 therethrough. Positioned on the upper surface 16 of the body section 14 is a square-shaped top 17 of smaller dimensions than the body section 14. Again, top 17 can be of any desired shape as long as it covers cavity 18, hereinafter described in detail. The body section 14 and top 17 are constructed out of a buoyant watertight material, preferably high density styrofoam.

Disposed through the center of the body section 14 is a cavity 18 with a cross-sectional shape of a truncated cone. The cavity 18 has its larger opening through the bottom surface 15 and tapers inwardly through the upper surface 16.

Positioned within the cavity 18 is the illuminating means 12. It has been found that the preferable source of illumination is a sealed beam signal light, usually a 12 volt model. This type of light is lightweight and compact but yet provides a very bright luminescence. An automobile headlight, while an adequate source of light, is too heavy and requires a larger current than does the sealed beam signal light 12. The light 12 is itself buoyant and aids in the floating characteristic of the apparatus 10.

The glass shield on the light 12 protrudes below the bottom surface 15 with the outer edge of the light 12 being substantially in the plane of surface 15.

The connecting means 13 includes an insulated electrical cable 19 with one end attached by suitable means, such as soldering, to the terminals 20 of the light 12. The distal end of the cable 19 has attached thereto a pair of battery clamps 21 for connecting to the terminals 22 of a storage battery 23. The battery 23 may be located in the fisherman's boat as shown in FIG. 2 or on a dock as when the fisherman is not fishing from his boat.

The cable 19 exists the top 17 by means of hole 24 centrally disposed therethrough and being of a sufficient width to receive the cable 19. The cable 19 can be of any sufficient length to permit the light apparatus 10 to float at least a few feet away from wherever the battery 23 is located. The cable 19 may also be of considerable length so that it may float some distance from the fisherman's boat to permit other boats to fish around it and use its light. The apparatus 10 can also be used as a life support means, such as when a person is in danger of drowning. The person can hold onto the apparatus 10 and can be pulled to safety by the cable 19.

The top 17 is secured to the upper surface 16 by suitable fastening means, such as glue, and acts as a cover for the cavity 18. It is desirable that the particular glue be effective in bonding styrofoam to styrofoam and also glass to styrofoam. In this manner, the same glue can be used to secure not only the top 17 to the upper surface 16 but also the light 12 within the cavity 18 by applying it around the outer edges of the light 12 before positioning it within the cavity 18. The glue can also be used to plug up the hole 24 so as to assure that the apparatus 10 is watertight.

The cavity 18 has a sufficient depth so as to receive the light 12 plus a few coils of the cable 19. Thus, when the time comes for the light 12 to be replaced, it can be pried loose from its seal within the cavity 18, detached from the cable 19, a new light can be secured to the cable 19, and a new glue seal can then be formed around the edges of the light 12 and cavity 18. The coils of the cable 19 within the cavity 18 provide a means of insuring that the light 12 can be replaced without disturbing the seal made within the hole 24 by the glue.

In the operation of the apparatus 10, the cables 21 are attached to the terminals 22 of the battery 23 whereby the light 12 is activated. The fisherman then places the apparatus 10 on the surface of the water so that the emitted light from light 12 is directed underwater. The bottom surface 15 acts as a reflecting surface for the light, thereby increasing the brilliance of the light emitted therefrom. Flying insects are attached to the light 12 and, in an attempt to get to the light 12, blindly hit the surface of the water whereby small fish which are also attracted by the light eat the insects. Larger fish, such as crappie, catfish and carp, are drawn to the area by the light and eat the small fish. The fisherman with his line in the water can then catch these large fish.

More insects tend to hit the surface of the water than with previous night fishing means because of their attraction to the underwater illumination provided by the apparatus 10 than by a light positioned on the water so as to direct its illumination above the surface of the water, as with a lantern. This is true because with a lantern, the insects first tend to swarm around the light before they hit the surface of the water. With the apparatus 10, the insects tend to be oblivious to the water surface and do not swarm around in the air above the apparatus 10. The apparatus 10 also tends to attract more fish than if the light 12 shone above the surface of the water, as with a lantern.

It is best to have a large body section 14 so as to provide a stable, floating member that will not be upset by any waves on the surface of the water. Because of the stability of a large body section 14, the apparatus 10 does not need any other anchoring means besides the cable 19 which helps to maintain the apparatus 10 in a particular location on the water surface.

In a particular construction of the apparatus 10, the following dimensions were utilized:

a. Section 14 — 2 inches × 11 inches × 11 inches
b. top 17 — 1 inch × 5 inches × 5 inches
c. cavity 18 — 2 inches deep; 4 ⅝ inches across surface 15 and tapering to 3 inches across surface 16.

Another embodiment of the apparatus 10 would be a self-contained unit wherein the power source was located on the support means 11, eliminating the need for cable 19. However, it has been found that the inclusion of a power source on the support means 11 tends to make the apparatus 10 too heavy for effective flotation.

It is obvious that one skilled in the art may make modifications in the details of construction without departing from the spirit of the invention which is set out in varying scope in the appended claims.

What is claimed:

1. A fishing float light to provide underwater illumination comprising in combination:

a. a support means capable of floating on a body of water, said support means having an upwardly tapering opening extending from the bottom to the top thereof;

b. a sealed beam electric light having a convex upper surface fitted into the lower end of said opening and contacting the tapered wall thereof throughout its circumference, the illuminating surface of said light being directed downwardly and lying substantially in the plane of the bottom of said support means;

c. a cover plate overlying and completely closing the upper end of said opening, said cover plate having a central opening therethrough; and d. an electrical conductor passing through said opening, said conductor being electrically connected at one end to said light and having provision at its opposite end for connection to a source of electricity.

2. A fishing float light as in claim 1 wherein means are provided for sealing said light in said opening, sealing said cover plate to said support means and sealing said electrical conductor in the opening in said cover plate.

3. A fishing float as in claim 2 wherein the sealing means is a glue.

4. A fishing float as in claim 3 wherein said electrical conductor is a flexible wire, a portion of which between the light and the sealed opening in the cover plate is coiled and received in the tapered opening through said support means and above said light whereby, when the light or a part thereof is to be replaced, the light may be removed from said support means to the extent of said coiled wire without breaking the seal between the wire and the cover plate.

* * * * *